US012773303B2

(12) United States Patent
Huang et al.

(10) Patent No.: US 12,773,303 B2
(45) Date of Patent: Oct. 27, 2026

(54) HOUSING AND ORAL IRRIGATION APPARATUS

(71) Applicant: Shenzhen Soocas Technology Co., Ltd., Shenzhen (CN)

(72) Inventors: Daode Huang, Shenzhen (CN); Yuanping Zhang, Shenzhen (CN); Fandi Meng, Shenzhen (CN)

(73) Assignee: SHENZHEN SOOCAS TECHNOLOGY CO., LTD., Shenzhen (CN)

(*) Notice: Subject to any disclaimer, the term of this patent is extended or adjusted under 35 U.S.C. 154(b) by 425 days.

(21) Appl. No.: 18/559,112

(22) PCT Filed: Apr. 29, 2022

(86) PCT No.: PCT/CN2022/090417
§ 371 (c)(1),
(2) Date: Nov. 6, 2023

(87) PCT Pub. No.: WO2022/237593
PCT Pub. Date: Nov. 17, 2022

(65) Prior Publication Data

US 2024/0225800 A1 Jul. 11, 2024

(30) Foreign Application Priority Data

May 8, 2021 (CN) ......................... 202120980888.5

(51) Int. Cl.
*A61C 17/02* (2006.01)

(52) U.S. Cl.
CPC .................................... *A61C 17/02* (2013.01)

(58) Field of Classification Search
CPC .......... A61C 17/00; A61C 17/02–0208; A61C 17/022–028; A61H 9/00–0007; A61H 9/0021–0028; A61H 13/00–005
See application file for complete search history.

(56) References Cited

U.S. PATENT DOCUMENTS

2016/0220339 A1* 8/2016 Zhao .................. A61C 17/0217
2017/0224452 A1* 8/2017 Chang .................. A61H 13/005
(Continued)

FOREIGN PATENT DOCUMENTS

CN 202875517 U 4/2013
CN 107198588 A 9/2017
(Continued)

OTHER PUBLICATIONS

The Office Action of RU patent application No. 2023131112/14(069047) issued on Apr. 27, 2024.
(Continued)

*Primary Examiner* — Rachel T Sippel
(74) *Attorney, Agent, or Firm* — HOWARD M COHN and Associates, LLC

(57) ABSTRACT

A housing (10) and an oral irrigation apparatus, which relate to the technical field of oral cleaning. The housing (10) is provided with an accommodating space (101), a first channel (102), and a first opening (103) and second opening (104) which are separately in communication with the first channel (102). The accommodating space (101) is used for accommodating a cleaning liquid. When the cleaning liquid is extracted during the operation of the oral irrigation apparatus, outside gas may enter the accommodating space (101) through the first opening (103), the first channel (102), and the second opening (104) in sequence, so as to avoid the generation of a negative pressure in the accommodating space (101) due to the extraction of the cleaning liquid, so that a cleaning water column for cleaning the teeth and oral cavity cannot be formed.

17 Claims, 8 Drawing Sheets

(56) References Cited

U.S. PATENT DOCUMENTS

| | | | | |
|---|---|---|---|---|
| 2018/0168326 | A1 | 6/2018 | Davies-Smith et al. | |
| 2020/0276003 | A1 | 9/2020 | Luettgen | |
| 2022/0233291 | A1* | 7/2022 | DeZan ..................... | A61C 5/46 |
| 2024/0008964 | A1* | 1/2024 | Johnson ............. | A61C 17/0202 |

FOREIGN PATENT DOCUMENTS

| | | | |
|---|---|---|---|
| CN | 107802365 | A | 3/2018 |
| CN | 111388116 | A | 7/2020 |
| CN | 111544145 | A | 8/2020 |
| EP | 3682846 | A | 7/2020 |
| GB | 994392 | A | 6/1965 |
| JP | S5813325 | A | 1/1983 |
| JP | H1189858 | A | 4/1999 |
| JP | 2011200424 | A | 10/2011 |
| RU | 67867 | U1 | 11/2007 |
| RU | 155191 | U1 | 9/2015 |
| RU | 192334 | U1 | 9/2019 |
| WO | 2012176986 | A2 | 12/2012 |

OTHER PUBLICATIONS

International Search Report of PCT Patent Application No. PCT/CN2022/090417 issued on Jul. 27, 2022.
The extended European search report of EP patent application No. 22806561.1 issued on Apr. 16, 2024.
The First Japanese Office Action dated Aug. 27, 2024; Appl. No. 2023-568627 (12 pages).

* cited by examiner

HOUSING AND ORAL IRRIGATION APPARATUS

The present application claims priority to the Chinese patent application No. 202120980888.5 filed to the CNIPA on May 8, 2021, the entire contents of which are incorporated herein by reference.

TECHNICAL FIELD

The present application relates to the technical field of oral cleaning, and in particular relates to a housing and an oral irrigation apparatus.

BACKGROUND

An oral irrigation apparatus is an apparatus used to care for the oral cavity. The oral irrigation apparatus can use a certain pressure to spray a cleaning water column to clean teeth and oral cavity. At present, it is widely used in people's daily life.

The water tank structure in the existing oral irrigation apparatus often uses a one-way valve for air intake. The one-way valve is prone to failure after being used for a period of time, which leads to the fact that gas cannot enter the water tank when the oral irrigation apparatus is working, resulting in negative pressure in the water tank, and the cleaning water column cannot be drawn out to clean teeth and oral cavity.

SUMMARY OF THE INVENTION

Technical Problem

Based on this, it is necessary to provide a housing and an oral irrigation apparatus, aiming to solve the technical problem that the existing oral irrigation apparatus cannot be used due to the failure of the one-way valve.

Technical Solution

In order to solve the above technical problem, the first technical solution adopted in the present application is a housing for an oral irrigation apparatus, the housing is provided with an accommodating space, the accommodating space is used for accommodating a cleaning liquid used by the oral irrigation apparatus, and the housing is further provided with a first channel, and a first opening and a second opening which are separately communication with the first channel, wherein the first opening is used for communicating the first channel with the outside world, and the second opening is used for communicating the accommodating space with the first channel.

In some embodiments of the housing, the second opening comprises a first end communicated with the first channel and a second end communicated with the accommodating space, wherein the first end has a larger cross-sectional area than that of the second end.

In some embodiments of the housing, the housing is provided with a step part, the step part is accommodated in the first channel, one side of the step part facing the first channel is provided with a plurality of step surfaces, and at least one of the step surfaces is formed with at least one of the first ends.

In some embodiments of the housing, the housing comprises a first housing and a second housing, which are enclosed to form the accommodating space, and the first housing can move along a first direction relative to the second housing so as to change the volume of the accommodating space.

In some embodiments of the housing, the first channel extends along the first direction, and two opposite ends of the first channel along the first direction are separately communication with the first opening and the second opening.

In some embodiments of the housing, the housing comprises a first housing and a second housing, wherein the first housing comprises a housing wall and a cover body, the housing wall and the second housing are enclosed to form the accommodating space, and the cover body and the housing wall are arranged at least partially at intervals to form the first opening.

In some embodiments of the housing, the cover body is provided with a third opening and a second channel communicated with the first channel, wherein the third opening is used for communicating the second channel with the first opening, and the third opening comprises a third end communicated with the first opening and a fourth end communicated with the second channel, and the third end has a smaller cross-sectional area than that of the fourth end.

In some embodiments of the housing, the cover body is further provided with an accommodating cavity, the cover body is provided with a protrusion extending to the accommodating cavity, and the third opening is formed on the protrusion and is communicated with the first opening through the accommodating cavity.

In some embodiments of the housing, the housing wall is provided with an opening, the opening is covered by the cover body, and the cover body comprises an upper cover and a lower cover, which are enclosed to form the accommodating cavity, and the upper cover and a mouth wall of the opening are arranged at least partially at intervals to form the first opening, and the lower cover is hermetically connected with the mouth wall, and the second channel penetrates through the lower cover.

In some embodiments of the housing, the upper cover and the lower cover are arranged at least partially at intervals to form a third channel, and the third channel is used for communicating the accommodating cavity with the first opening.

In some embodiments of the housing, the housing wall is provided with a channel wall which encloses to form the first channel, and the cover body is at least partially inserted and sealed with the channel wall, so that the first channel is communicated with the second channel.

In some embodiments of the housing, the housing further comprises a sealing element, the sealing element is at least partially accommodated in the first channel so as to seal space between the cover body and the channel wall, and the sealing element is provided with a fourth opening, the fourth opening is used for communicating the first channel with the second channel.

In order to solve the above technical problem, the second technical solution adopted in the present application is an oral irrigation apparatus, comprising the housing as described above, and the oral irrigation apparatus further comprises a irrigation component which is accommodated in the housing.

Beneficial Effects

The implementation of the embodiments of the present application will have the following beneficial effects:

The housing of the above technical solution is applied to the oral irrigation apparatus, which not only has the efficacy of protecting the oral irrigation apparatus, but also can ensure that the gas can smoothly enter and exit the housing during the working process of the oral irrigation apparatus, so as to avoid generating negative pressure and failing to form a cleaning water column for cleaning teeth and oral cavity. Specifically, the housing is provided with an accommodating space, a first channel, and a first opening and a second opening which are separately communication with the first channel. The accommodating space is used for accommodating the cleaning liquid, and the accommodating space can communicate with the outside world through the second opening, the first channel and the first opening in sequence. Therefore, when the cleaning liquid is drawn during the working process of the oral irrigation apparatus, the outside air can enter the accommodating space through the first opening, the first channel and the second opening in sequence, thereby preventing the extraction of the cleaning liquid from generating the negative pressure in the accommodating space, and failing to form the cleaning water column for cleaning teeth and oral cavity.

BRIEF DESCRIPTION OF THE DRAWINGS

In order to more clearly explain the embodiments of the present application or the technical solution in the prior art, the accompanying drawings needed to be used in the description of the embodiments or the prior art will be briefly introduced hereinafter. Obviously, the accompanying drawings in the following description are only some embodiments of the present application, and other accompanying drawings can be obtained according to these accompanying drawings without creative works for those of ordinary skill in the art.

Wherein.

DETAILED DESCRIPTION

Figure 1:
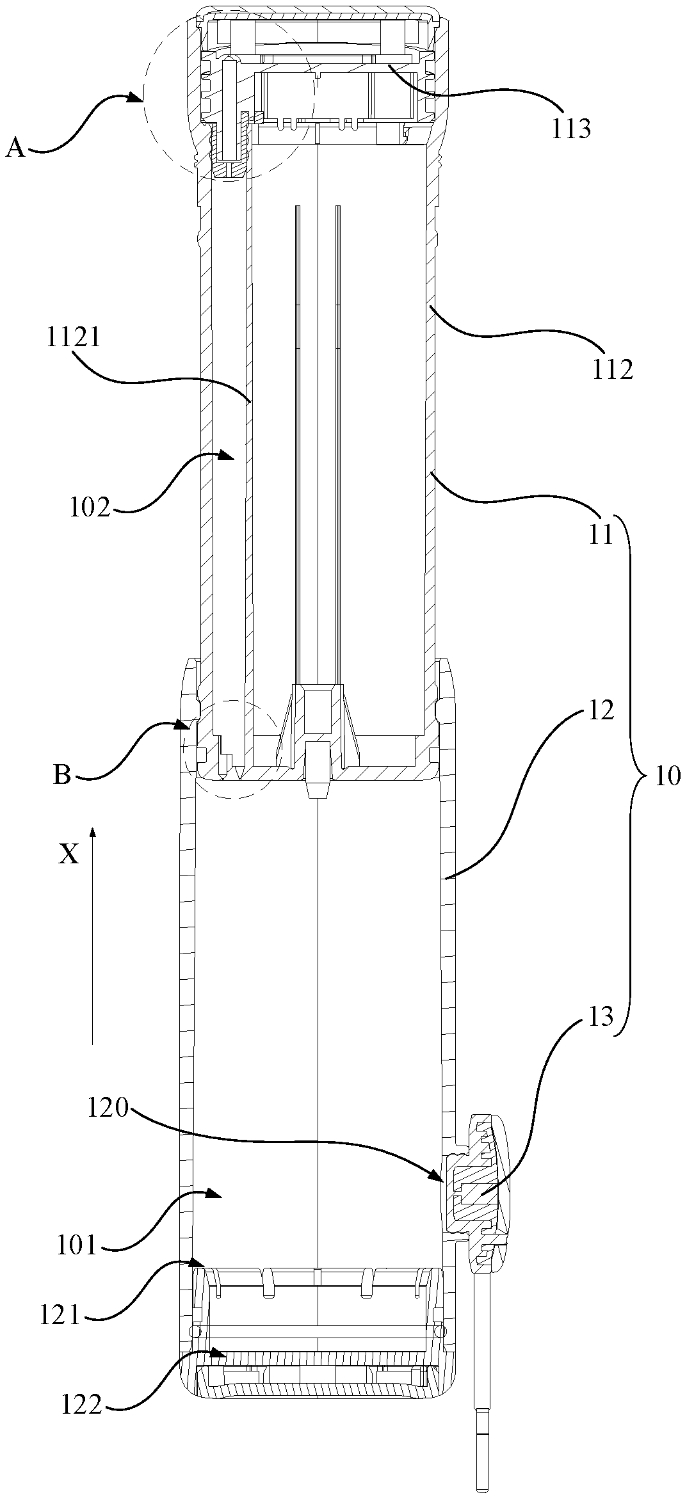
FIG. 1 is a cross-sectional view of a housing of an oral irrigation apparatus in an embodiment.

Hereinafter, the technical solution in the embodiment of the present application will be clearly and completely described with reference to the accompanying drawings in the embodiment of the present application. Obviously, the described embodiment is only a part of the embodiment of the present application, but not the whole embodiment. Based on the embodiments in the present application, all other embodiments obtained by those of ordinary skill in the art without creative works fall within the scope of protection of the present application.

The embodiment of the present application provides an oral irrigation apparatus, which is an oral cleaning apparatus, such as a water flosser. The oral irrigation apparatus comprises a housing and an irrigation component. The irrigation component is accommodated in the housing. The oral irrigation apparatus uses the irrigation component to draw cleaning liquid and generate a cleaning water column with a certain pressure to clean teeth and oral cavity. The cleaning liquid can be clean water or a mixture of clean water and a cleaning reagent.

Specifically, as shown in FIGS. 1 to 4 and FIG. 6, the housing 10 is provided with an accommodating space 101. The accommodating space 101 is used for accommodating a cleaning liquid used by the oral irrigation apparatus. The housing 10 is further provided with a first channel 102, and a first opening 103 and a second opening 104 which are separately communication with the first channel 102, wherein the first opening 103 is used for communicating the first channel 102 with the outside world. The second opening 104 is used for communicating the accommodating space 101 with the first channel 102.

In view of the foregoing, the implementation of the embodiments of the present application will have the following beneficial effects. The housing 10 of the above technical solution is applied to the oral irrigation apparatus, which not only has the efficacy of protecting the oral irrigation apparatus, but also can ensure that the gas can smoothly enter and exit the housing 10 during the working process of the oral irrigation apparatus, so as to avoid generating negative pressure and failing to form a cleaning water column for cleaning teeth and oral cavity. Specifically, the housing 10 is provided with an accommodating space 101, a first channel 102, and a first opening 103 and a second opening 104 which are separately communication with the first channel 102. The accommodating space 101 is used for accommodating the cleaning liquid, and the accommodating space 101 can communicate with the outside world through the second opening 104, the first channel 102 and the first opening 103 in sequence. Therefore, when the cleaning liquid is drawn during the working process of the oral irrigation apparatus, the outside air can enter the accommodating space 101 through the first opening 103, the first channel 102 and the second opening 104 in sequence, thereby preventing the extraction of the cleaning liquid from generating the negative pressure in the accommodating space 101, and failing to form the cleaning water column for cleaning teeth and oral cavity.

Figure 2:
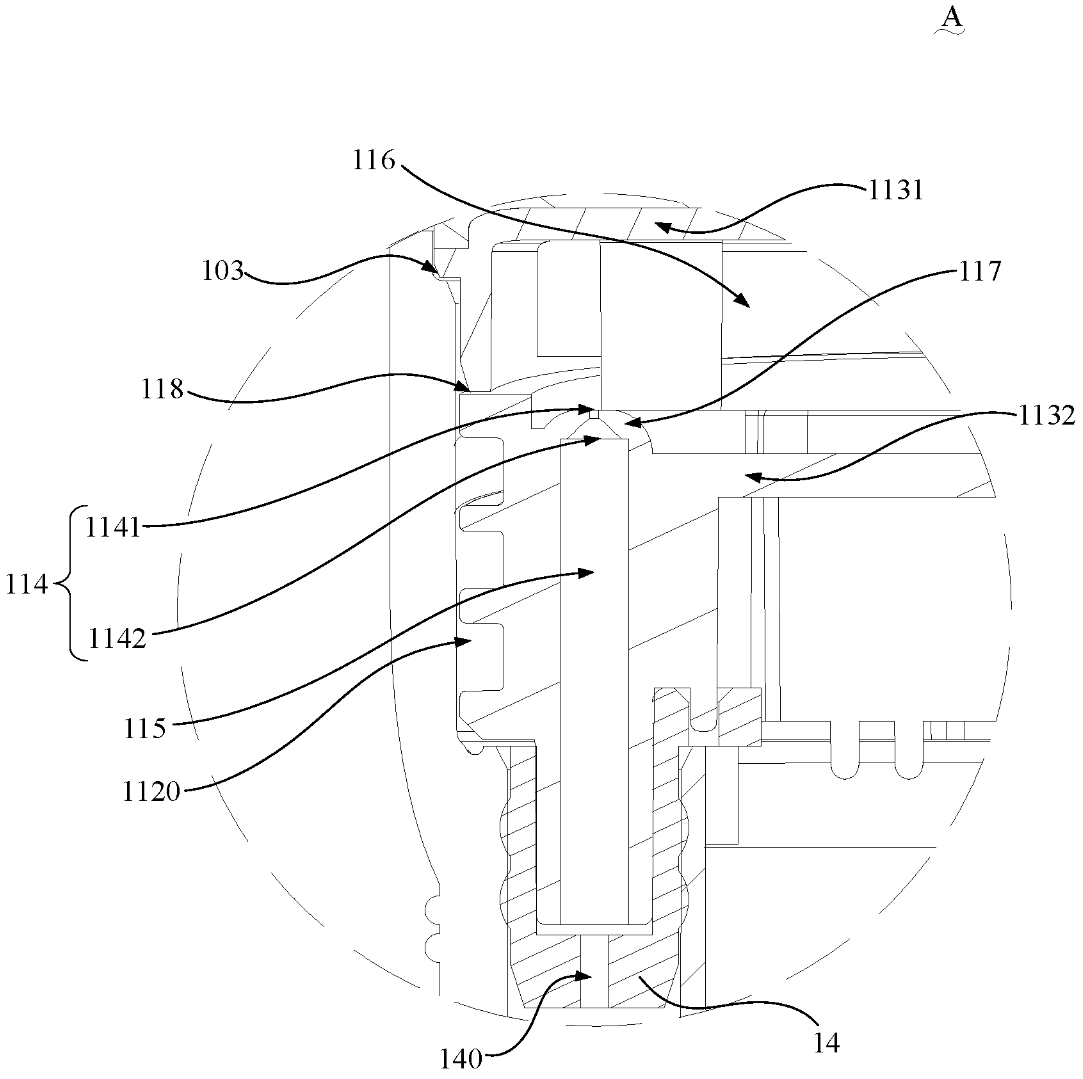
FIG. 2 is an enlarged structural diagram of part A in FIG. 1.

In an embodiment, as shown in FIG. 2, the second opening 104 comprises a first end 1041 communicated with the first channel 102 and a second end 1042 communicated with the accommodating space 101. The first end 1041 has a larger cross-sectional area than that of the second end 1042. In this way, the second opening 104 is blocked by the surface tension of the cleaning liquid at the second end 1042 while facilitating the entry of the external air into the accommodating space 101, thereby reducing the risk of the cleaning liquid entering the first channel 102 and preventing the gas from not being able to enter and exit the housing 10 smoothly caused by the cleaning liquid blocking the first channel 102.

Figure 3:
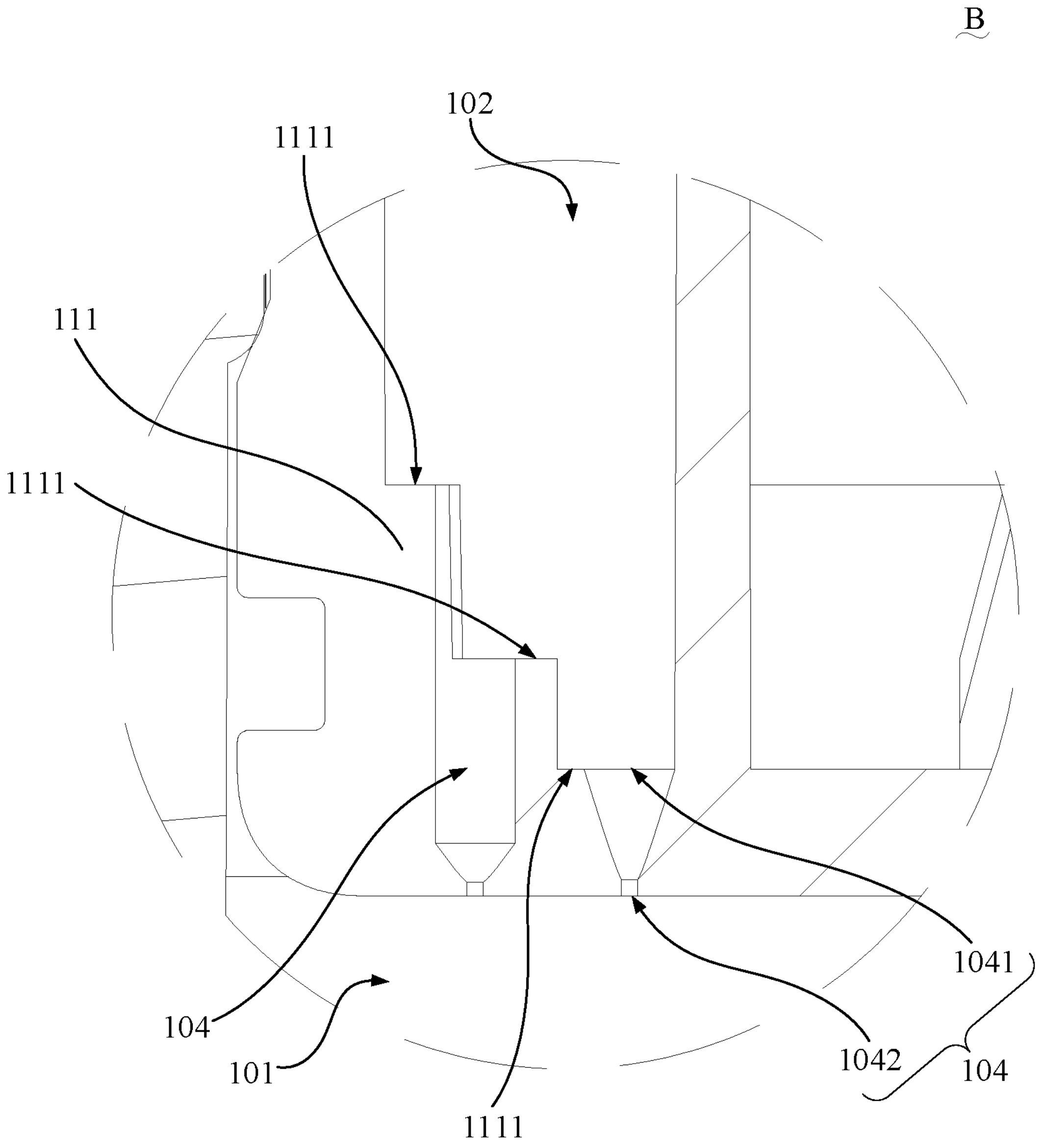
FIG. 3 is an enlarged structural diagram of part B in FIG. 1.
Figure 4:
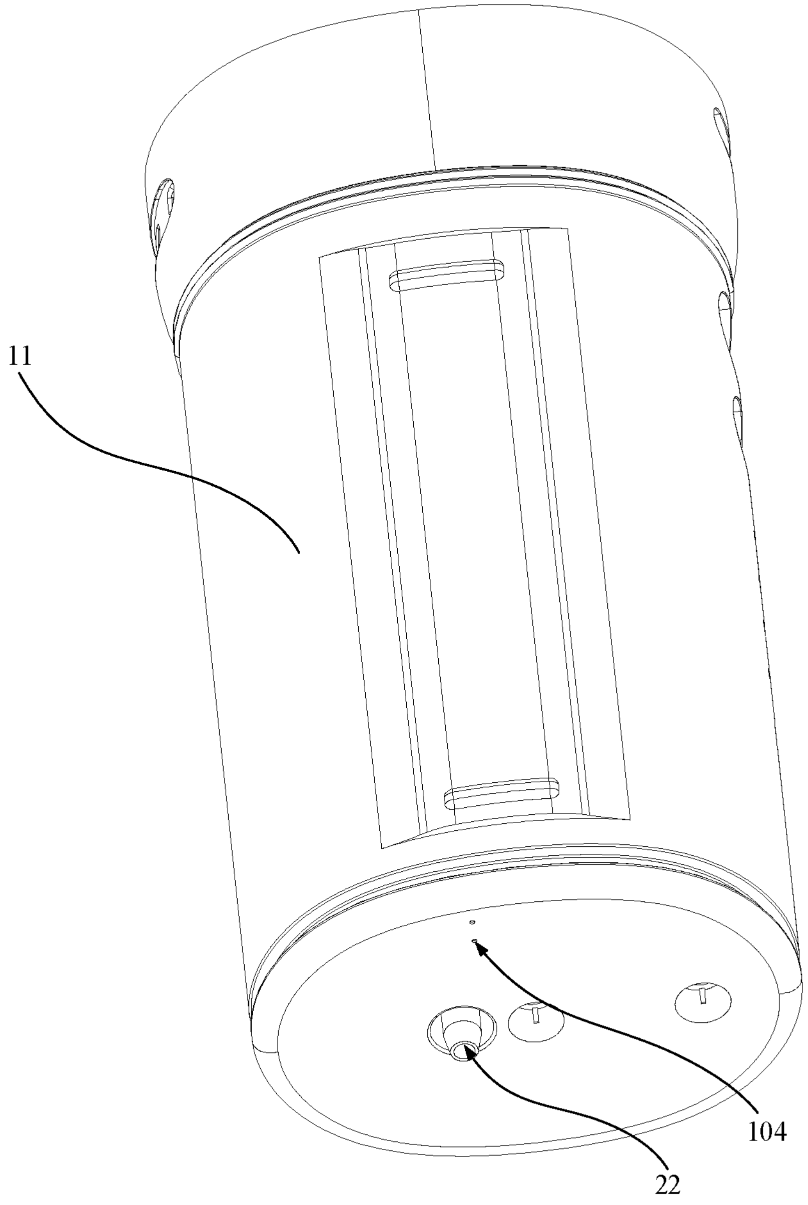
FIG. 4 is an axial view of the first housing in the oral irrigation apparatus shown in FIG. 1.

In an embodiment, as shown in FIG. 3, the housing 10 is provided with a step part 111, the step part 111 is accommodated in the first channel 102, one side of the step part 111 facing the first channel 102 is provided with a plurality of step surfaces 1111, and at least one of the step surfaces 1111 is formed with at least one of the first ends 1041. In this way, the arrangement of the step part 111 can prevent impurities from blocking the second opening 104 when the gas enters the accommodating space 101 by using a drop of the adjacent step surfaces 1111. Specifically, there is a drop between step surfaces 1111, the first end 1041 located on the step surface 1111 with a relatively higher position is less likely to be blocked than the first end 1041 located on the step surface 1111 with a relatively lower position. Therefore, when the first end 1041 with a relatively lower position is blocked, the first end 1041 with a relatively higher position can still remain unobstructed, which is convenient for gas to smoothly enter and exit the housing 10. Specifically, the plurality of the step surfaces 1111 comprises a step surface 1111 with a first end 1041 and a step surface 1111 without the first end 1041. The drop between the step surfaces 1111 is used to make the positions of the first ends 1041 staggered. When one of the first ends 1041 is blocked, the rest of the first ends 1041 can still remain unobstructed. In this embodiment, the second opening 104 is in one-to-one correspondence with the first end 1041 and is perpendicular to the corresponding step surface 1111 and penetrates through the step part 111. The step surface 1111 without the first end 1041 has higher strength because there is no second opening 104 corresponding to the step part 111, which can improve the overall strength of the housing 10. It can be understood that in other embodiments, the second opening 104 may have a plurality of first ends 1041, and each first end 1041 is distributed on at least two step surfaces 1111.

In an embodiment, as shown in FIG. 1, the housing 10 comprises a first housing 11 and a second housing 12, which are enclosed to form the accommodating space 101, and the first housing 11 can move along a first direction relative to the second housing 12 so as to change the volume of the accommodating space 101. In this way, by adjusting the positions of both the first housing 11 and the second housing 12, the volume of the accommodating space 101 can be increased to accommodate more cleaning liquid. At the same time, the volume of the accommodating space 101 can be adjusted to a preset volume, so as to facilitate a ratio of clean water and cleaning reagent mentioned above. In this embodiment, the second housing 12 is provided with an inlet 120, so as to facilitate the addition of clean water, cleaning reagents and pre-prepared mixture of clean water and a cleaning reagent. The housing 10 further comprises a plug 13 to seal the inlet 120. In this embodiment, the second housing 12 is provided with a mouth part 121 and a cover 122 for sealing the mouth part 121. The cover 122 can be detachably connected with the second housing 12 to facilitate cleaning the inner wall of the second housing 12 corresponding to the accommodating space 101, so as to ensure the cleanliness of the cleaning liquid. Further, the first direction is parallel to the direction indicated by the arrow x in FIG. 1.

In an embodiment, as shown in FIGS. 1 to 3, the first channel 102 extends along the first direction, and two opposite ends of the first channel 102 along the first direction are separately communication with the first opening 103 and the second opening 104. In this way, the distance between the first opening 103 and the second opening 104 can be reduced to facilitate the smooth entry and exit of gas into the housing 10.

In an embodiment, as shown in FIGS. 1 and 2, the first housing 11 comprises a housing wall 112 and a cover body 113, the housing wall 112 and the second housing 12 are enclosed to form the accommodating space 101. The cover body 113 and the housing wall 112 are arranged at least partially at intervals to form the first opening 103. In this way, the gap between the cover 113 and the housing wall 112 is used to form the first opening 103, so as to prevent the impurities with larger size from entering the first channel 102 due to the oversize of the first opening 103. At the same time, the first opening 103 is located between the cover body 113 and the housing wall 112, and is arranged around the cover body 113 to ensure thereof have a large gas circulation area. The arrangement of the first opening 103 can also ensure that when the first opening 103 is partially blocked, other positions can remain unobstructed. It is also possible to reduce the suction force acting on impurities when they partially block the first opening 103, and prevent them from being sucked into the first channel 102.

In an embodiment, as shown in FIG. 2, the cover body 113 is provided with a third opening 114 and a second channel 115 communicated with the first channel 102, wherein the third opening 114 is used for communicating the second channel 115 with the first opening 103, and the third opening 114 comprises a third end 1141 communicated with the first opening 103 and a fourth end 1142 communicated with the second channel 115, and the third end 1141 has a smaller cross-sectional area than that of the fourth end 1142. This can further prevent impurities from entering the second channel 115 from the third opening 114 and then entering the first channel 102.

Figure 8:
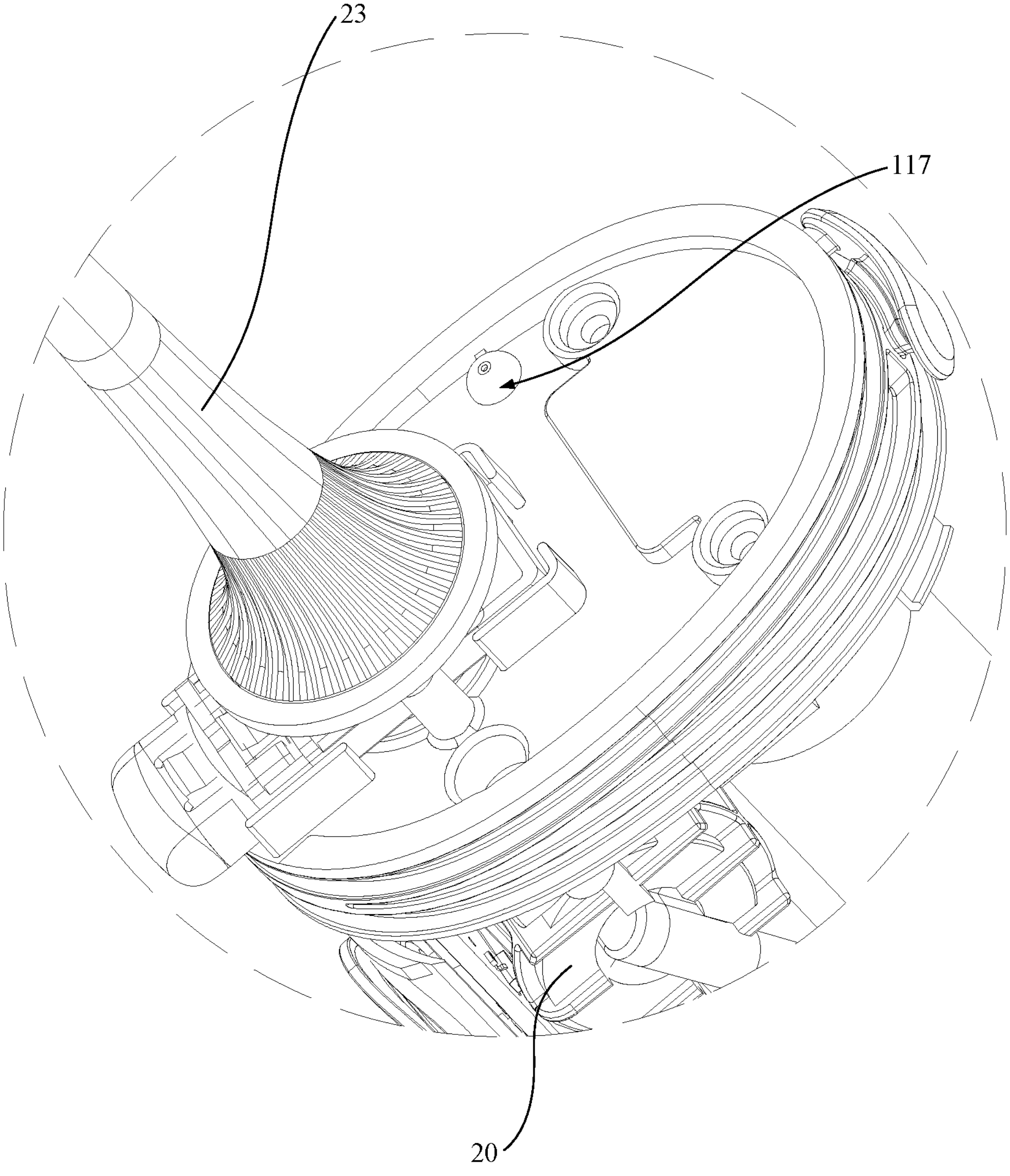
FIG. 8 is a partial schematic view of the position of the lower cover in the oral irrigation apparatus shown in FIG. 1 from another perspective.

In an embodiment, as shown in FIGS. 2 and 8, the cover body 113 is further provided with an accommodating cavity 116, the cover body 113 is provided with a protrusion 117 extending to the accommodating cavity 116, and the third opening 103 is formed on the protrusion 117 and is communicated with the first opening 103 through the accommodating cavity 116. The arrangement of the protrusion 117 can prevent impurities from blocking the third opening 114. Specifically, the protrusion of the protrusion 117 into the accommodating cavity 116 can make the position of the third end 1141 higher than a deposition layer formed by impurities in the accommodating cavity 116, and prevent the third end 1141 from being blocked.

Further, as shown in FIG. 2, the side of the protrusion 117 facing the accommodating cavity 116 has an arc surface. In this way, the third end 1141 can be located at the top of the arc surface, so as to be as far away from the deposition layer of the impurities as possible and prevent the third end 1141 from being blocked.

In an embodiment, as shown in FIG. 2, the housing wall 112 is provided with an opening 1120, the opening 1120 is covered by the cover body 113. In this way, the cover 113 can be detachably connected with the housing wall 112, which is convenient for the irrigation component 20 to be installed in the first housing 11. Further, the cover body 113 comprises an upper cover 1131 and a lower cover 1132, which are enclosed to form the accommodating cavity 116, and the upper cover 1131 and a mouth wall of the opening 1120 are arranged at least partially at intervals to form the first opening 103, and the lower cover 1132 is hermetically connected with the mouth wall, and the second channel 115 penetrates through the lower cover 1132. In this way, the lower cover 1132 is hermetically connected with the mouth wall to prevent external gas and impurities from entering the first housing 11 from the space between the lower cover 1132 and the mouth wall, thereby affecting the normal operation of the irrigation component 20. The upper cover 1131 may be partially or completely spaced from the mouth wall to form the first opening 103. Further, the lower cover 1132 can be made of a softer material to increase the deformation when it is connected with the mouth wall in a sealing manner, so as to improve the sealing effect. The upper cover 1131 can be made of a hard material to improve the protection of the upper cover 1131 to the lower cover 1132 and prevent the external impact on the lower cover 1132 from reducing the sealing effect.

In an embodiment, as shown in FIG. 2, the upper cover 1131 and the lower cover 1132 are arranged at least partially at intervals to form a third channel 118, and the third channel 118 is used for communicating the accommodating cavity 116 with the first opening 103. In this way, the arrangement of the third channel 118 can further reduce the probability of impurities entering the receiving cavity 116 and ensure that gas can smoothly enter the housing 10.

Figure 5:
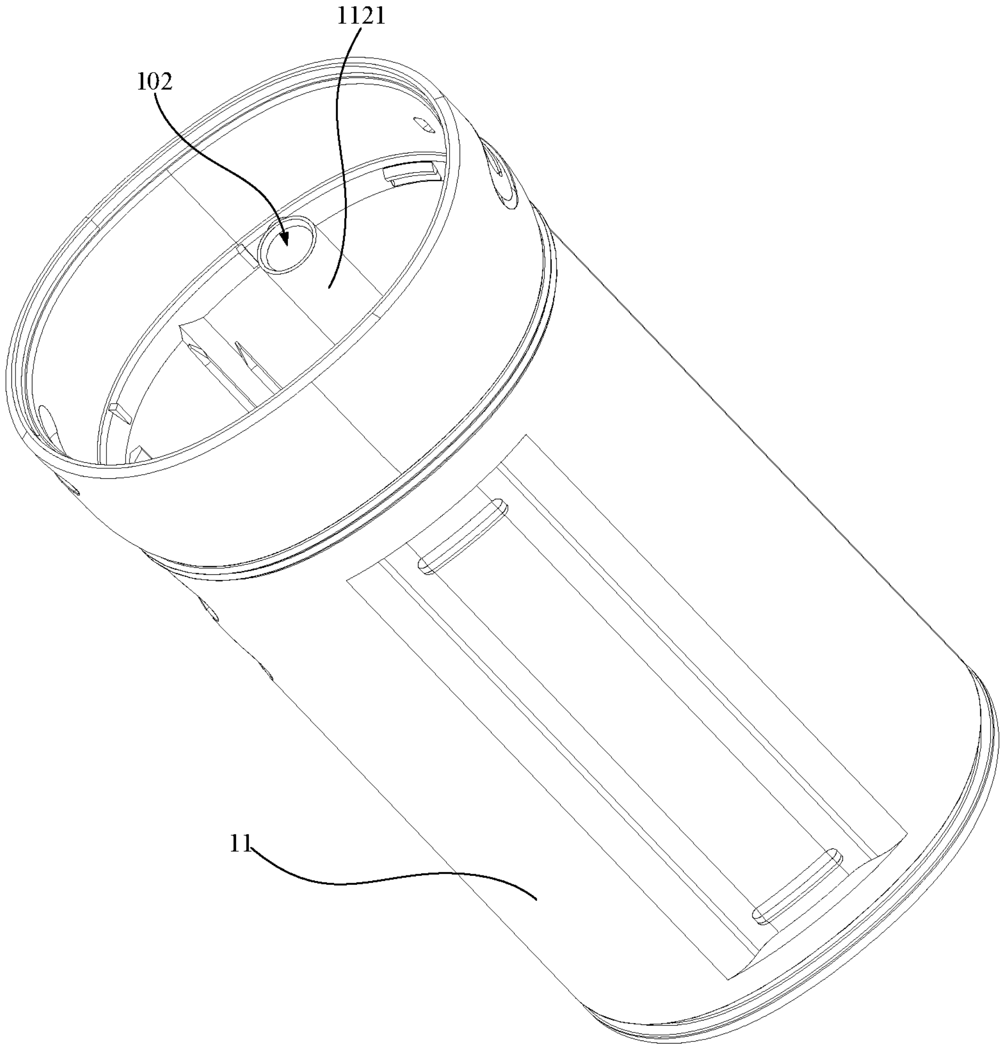
FIG. 5 is an axial view of the first housing in the oral irrigation apparatus shown in FIG. 1 from another perspective.
Figure 6:
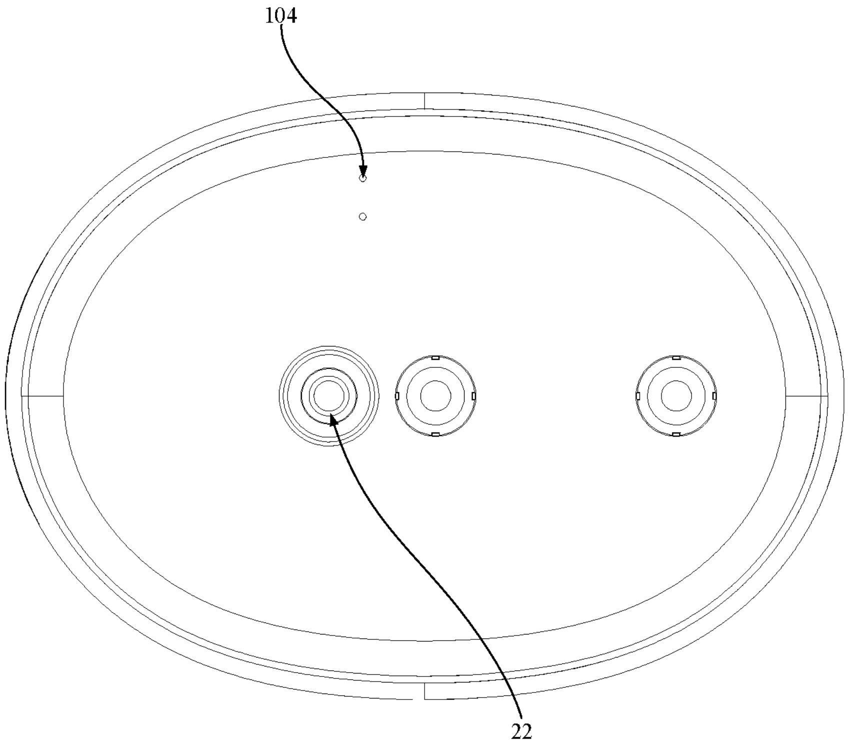
FIG. 6 is a top view of the first housing in the oral irrigation apparatus shown in FIG. 1.

In an embodiment, as shown in FIGS. 1 and 5, the housing wall 112 is provided with a channel wall 1121 which encloses to form the first channel 102. The arrangement of the channel wall 1121 ensures the stability of gas flow in the first channel 102. At the same time, gas damage to the flushing assembly 20 is avoided. Further, the cover body 113 is at least partially inserted and sealed with the channel wall 1121, such that the first channel 102 is communicated with the second channel 115.

Figure 7:
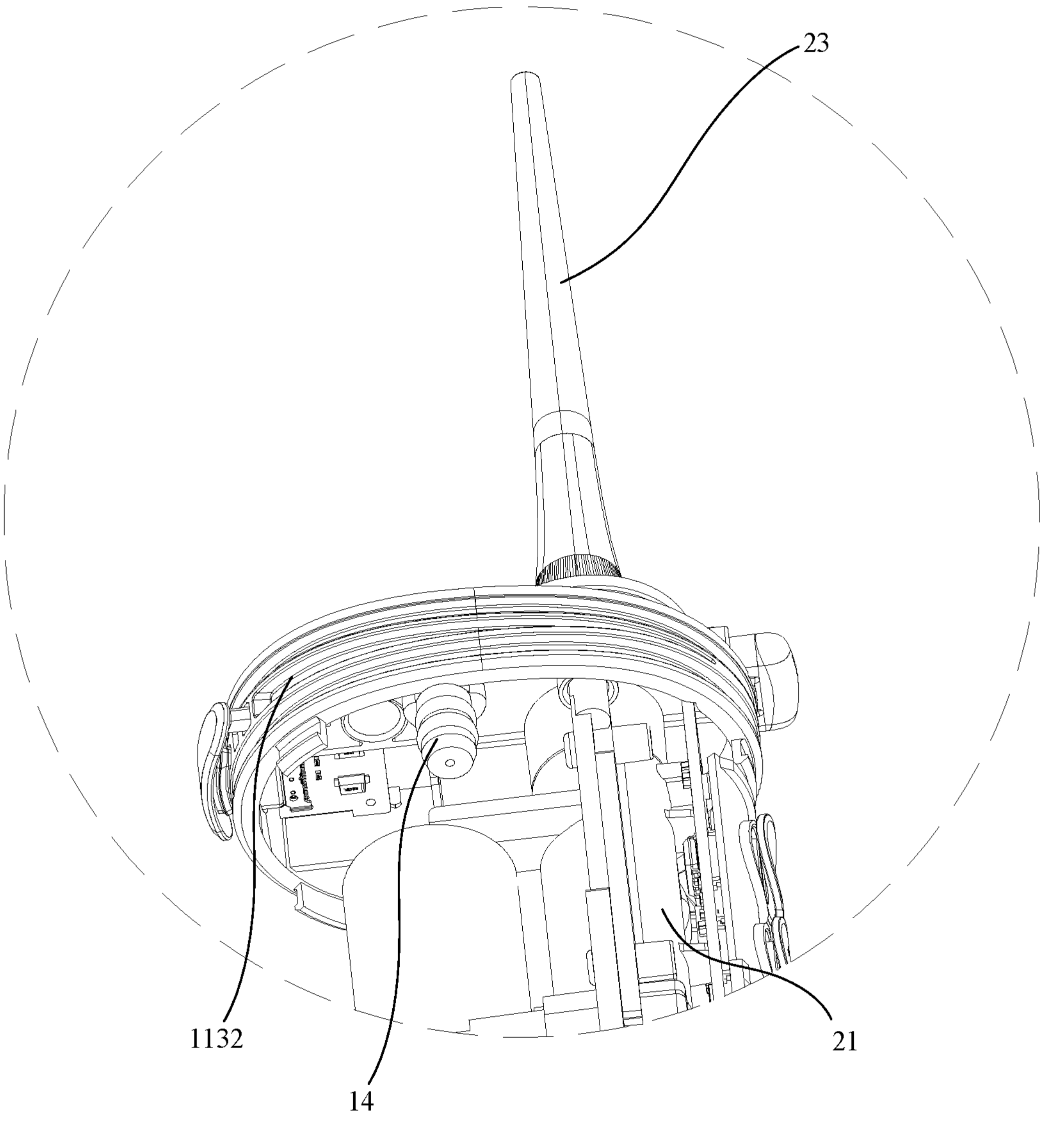
FIG. 7 is a partial schematic view of the position of the lower cover in the oral irrigation apparatus shown in FIG. 1.

Further, as shown in FIGS. 2 and 7, the housing 10 further comprises a sealing element 14, and the sealing member 14 is at least partially accommodated in the first channel 102 so as to seal space between the cover body 113 and the channel wall 1121. In this way, the sealing element 14 can further improve the seal performance between the cover body 113 and the channel wall 1121, and at the same time, the cover body 113 and the channel wall 1121 can be flexibly connected, so as to avoid the sealing failure between the cover body 113 and the channel wall 1121 caused by vibration. The sealing element 14 is provided with a fourth opening 140, and the fourth opening 140 is used for communicating the first channel 102 with the second channel 115.

In an embodiment, as shown in FIGS. 4 and 6 to 8, the irrigation component 20 comprises a driving unit 21 and a suction end 22 and a discharge end 23 located at both ends of the driving unit 21. The suction end 22 is arranged in the first housing 11 and communicates with the accommodating space 101. The discharge end 23 is connected with the lower cover 1132. The driving unit 21 can suck the cleaning liquid out of the accommodating space 101 through the suction end 22 and discharge it from the discharge end 23 at a certain pressure to clean teeth and oral cavity:

The technical features of the above-mentioned embodiments can be combined arbitrarily. In order to make the description concise, not all possible combinations of the technical features in the above-mentioned embodiments are described. However, as long as there is no contradiction between the combinations of these technical features, they should be considered as the scope recorded in the present specification.

What has been disclosed above is only the preferred embodiment of the present application, and of course it cannot be used to limit the scope of the present application, thereby the equivalent changes made according to the claims of the present application still fall within the scope of the present application.

What is claimed is:

1. A housing for an oral irrigation apparatus, wherein the housing is provided with an accommodating space, the accommodating space is used for accommodating a cleaning liquid used by the oral irrigation apparatus, and the housing is further provided with a first channel, and a first opening and a second opening which are separately in communication with the first channel, wherein the first opening is used for communicating the first channel with the outside world, and the second opening is used for communicating the accommodating space with the first channel, wherein the housing comprises a first housing and a second housing, wherein the first housing comprises a housing wall and a cover body, the housing wall and the second housing are enclosed to form the accommodating space, and the cover body and the housing wall are arranged at least partially at intervals to form the first opening.

2. The housing of claim 1, wherein the second opening comprises a first end communicated with the first channel and a second end communicated with the accommodating space, wherein the first end has a larger cross-sectional area than that of the second end.

3. The housing of claim 2, wherein the housing is provided with a step part, the step part is accommodated in the first channel, one side of the step part facing the first channel is provided with a plurality of step surfaces, and at least one of the step surfaces is formed with the first end.

4. The housing of claim 1, wherein the housing comprises the first housing and the second housing, which are enclosed to form the accommodating space, and the first housing can move along a first direction relative to the second housing so as to change the volume of the accommodating space.

5. The housing of claim 4, wherein the first channel extends along a first direction, and two opposite ends of the first channel along the first direction are separately in communication with the first opening and the second opening.

6. The housing of claim 1, wherein the cover body is provided with a third opening and a second channel communicated with the first channel, wherein the third opening is used for communicating the second channel with the first opening, and the third opening comprises a third end communicated with the first opening and a fourth end communicated with the second channel, and the third end has a smaller cross-sectional area than that of the fourth end.

7. The housing of claim 6, wherein the cover body is further provided with an accommodating cavity, the cover body is provided with a protrusion extending to the accommodating cavity, and the third opening is formed on the protrusion and is communicated with the first opening through the accommodating cavity.

8. The housing of claim 7, wherein the housing wall is provided with an opening, the opening is covered by the cover body, and the cover body comprises an upper cover and a lower cover, which are enclosed to form the accommodating cavity, and the upper cover and a mouth wall of the opening of the housing wall are arranged at least partially at the intervals to form the first opening, and the lower cover is hermetically connected with the mouth wall, and the second channel penetrates through the lower cover.

9. The housing of claim 8, wherein the upper cover and the lower cover are arranged at least partially at intervals to form a third channel, and the third channel is used for communicating the accommodating cavity with the first opening.

10. The housing of claim 6, wherein the housing wall is provided with a channel wall which is enclosed to form the first channel, and the cover body is at least partially inserted into and sealed with the channel wall, so that the first channel is communicated with the second channel.

11. The housing of claim 10, wherein the housing further comprises a sealing element, the sealing element is at least partially accommodated in the first channel so as to seal space between the cover body and the channel wall, and the sealing element is provided with a fourth opening, and the fourth opening is used for communicating the first channel with the second channel.

12. An oral irrigation apparatus, wherein comprising the housing of claim 1, and the oral irrigation apparatus further comprises an irrigation component which is accommodated in the housing.

13. The oral irrigation apparatus of claim 12, wherein the second opening comprises a first end communicated with the first channel and a second end communicated with the accommodating space, wherein the first end has a larger cross-sectional area than that of the second end.

14. The oral irrigation apparatus of claim 13, wherein the housing is provided with a step part, the step part is accommodated in the first channel, one side of the step part facing the first channel is provided with a plurality of step surfaces, and at least one of the step surfaces is formed with the first end.

15. The oral irrigation apparatus of claim 14, wherein the first channel extends along the first direction, and two opposite ends of the first channel along the first direction are separately in communication with the first opening and the second opening.

16. The oral irrigation apparatus of claim 12, wherein the cover body is provided with a third opening and a second channel communicated with the first channel, wherein the third opening is used for communicating the second channel with the first opening, and the third opening comprises a third end communicated with the first opening and a fourth end communicated with the second channel, and the third end has a smaller cross-sectional area than that of the fourth end.

17. The oral irrigation apparatus of claim 16, wherein the cover body is further provided with an accommodating cavity, the cover body is provided with a protrusion extending to the accommodating cavity, and the third opening is formed on the protrusion and is communicated with the first opening through the accommodating cavity.

* * * * *